UNITED STATES PATENT OFFICE.

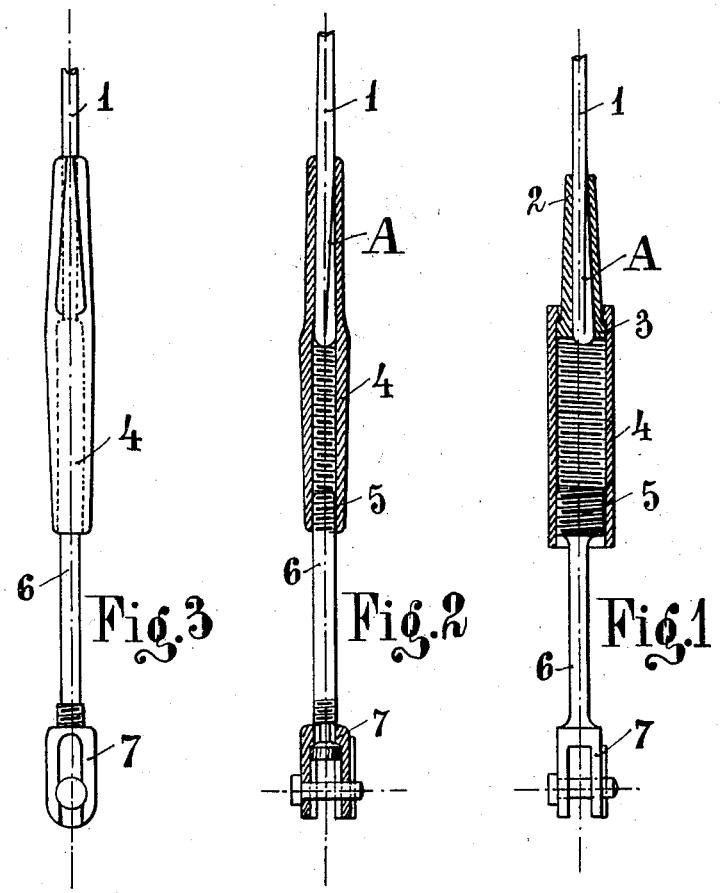

GIOVANNI QUAGLIA AND ARRIGO CAPELLO, OF TURIN, ITALY, ASSIGNORS TO CH. HENRI E. WETZELS, OF PARIS, FRANCE.

WIRE CONNECTION.

1,381,741.  Specification of Letters Patent.  Patented June 14, 1921.

Application filed September 8, 1917.  Serial No. 190,402.

*To all whom it may concern:*

Be it known that we, GIOVANNI QUAGLIA and ARRIGO CAPELLO, subjects of the King of Italy, and residents of Turin, Italy, have invented certain new and useful Improvements in Wire Connections, of which the following is a specification.

It is now practised to connect metallic wires or cables such as are used in connection with the construction of aeroplanes, to hooks, tightening devices and other members, by forming with the end of the wire or cable an eye which is then engaged with a corresponding hook or eye made on the part to be connected with said wire or cable.

This method gives rise to several drawbacks, not only because of the amount of work required, but also in view of its reduced resistance to the stresses acting on the wire and this latter in the proximity of its eye is not merely subjected to tensile stress but also to flexion stress and consequently the connections of this kind are extremely liable to break.

This invention relates to improved means for connecting metallic wires or cables to hooks, tightening devices and other members by utilizing the wedging action of an enlarged end of the wire or cable in a conical cavity of a sleeve connected to the hook, tightening device or other member.

In the annexed drawing Figure 1 shows in axial longitudinal section a connecting device according to this invention and adapted to connect wires; Fig. 2 is the same view of a modified construction; Fig. 3 shows the device illustrated in Fig. 2 in elevation in a plane at right angles to that of Fig. 2.

As shown in Fig. 1 the end of the wire 1 is first flattened and this flattened portion is bent up and pressed down upon itself so as to form an elongated head A the external profile of which is tapered. Then upon this head is fitted a sleeve 2 having a hole that is wider toward one end to suit the tapered head A of the wire.

The arrangement is such that the wire 1 fits more tightly in the sleeve 2 the greater the tensile stresses acting upon the wire, due to the wedge-like action between the tapered head A of the wire and the wedge shaped hole in the sleeve 2; furthermore the whole portion of wire engaged in the sleeve is subject to a simple tensile stress.

It is preferable for the hole in the sleeve 2, instead of being central, to have the wall inclined at one side only, the other side being coaxial with the sleeve and wire, as shown in Fig. 1. In this way the wire is caused to take up a central position and thus any deviation on its leaving the sleeve 2 as well as any tendency to bending or flexion is avoided.

The sleeve 2 may be attached in any suitable manner to the member to which it is desired to connect the wire. For example screw threaded members may be employed, or a pin may be used or any other suitable device.

In the arrangement shown in Fig. 1 the sleeve 2, in which the wire is engaged in the manner indicated, has an enlarged head 3 capable of rotating in a screw threaded socket 4 in which is screwed the end of a truss or the tie piece 6 provided with a fork 7. With this arrangement by turning the socket 4 it is possible to impart the desired tension to the wire 1 in the usual way, it being only necessary to screw thread the socket in one direction, thus rendering its construction more simple and economical than the usual tightening sockets having right and left hand screw threads.

In the construction shown in Figs. 2 and 3 the manufacture of the connecting member is still further simplified by the fact that the seat for the tapered head A of the wire is formed direct in a sleeve 4 which is screwed upon a truss 6 having a fork 7 rotatably connected thereto. For this purpose in that portion of the sleeve 4 not provided with a screw thread, there is made a conical hole corresponding to the diameter of the wire and this portion of the sleeve is pressed upon two opposite sides below the end in order to impart to the hole a shape suitable to receive the tapered head of the wire.

What we claim as our invention and desire to secure by United States Letters Patent is:

1. In combination, a wire-like rod having its end portion bent upon itself and having the portion between the end and bend lying for its entire length upon the unbent portion adjacent the bend, said portion between the end and the bend being reduced in thickness to form a wedge-like inclination inclining toward the end of the rod; and a housing to receive the rod provided with an aperture through which the rod extends, said aperture tapering to conform to the inclination of the wedge-like portion of the rod between the end and the bend whereby the bent portion of the rod fits snugly within the aperture and in close contact with the internal surface of the aperture.

2. In combination, a wire-like rod having its end portion bent upon itself and having the portion between the end and the bend lying for a substantial distance upon the unbent portion adjacent the bend, said portion between the end and the bend being reduced in thickness to form a wedge-like inclination inclining toward the end of the rod; and a housing to receive the rod provided with an aperture through which the rod extends, said aperture tapering to conform to the inclination of the wedge-like portion of the rod between the end and the bend whereby the bent portion of the rod fits snugly within the aperture and in close contact with the internal surface of the aperture.

3. In combination, a wire-like rod having its end portion bent upon itself and having the portion between the bend and the end lying for a substantial distance upon the unbent portion adjacent the bend, said portion between the end and the bend being reduced in thickness to form a wedge-like inclination inclining toward the end of the rod; and a housing to receive the rod and provided with an aperture through which the rod extends, said aperture tapering to conform to the inclination of the wedge-like portion of the rod between the end and the bend whereby the bent portion of the rod fits snugly within the aperture and in close contact with the internal surface of the aperture, a portion of the wall of the aperture being disposed parallel with the axis of the unbent portion of the wire.

4. In combination, a wire-like rod having its end portion bent upon itself and having the portion between the end and the bend lying for a substantial distance upon the unbent portion adjacent the bend, said portion between the end and the bend being reduced in thickness to form a wedge-like inclination inclining toward the end of the rod; and a housing to receive the rod and provided with an aperture through which the rod extends, said aperture tapering to conform to the inclination of the wedge-like portion of the rod between the end and the bend whereby the bent portion of the rod fits snugly within the aperture and in close contact with the internal surface of the aperture, the contact of the walls of the aperture with the wedge-like portion of the rod being increased by pressed-in portions of the housing at each side thereof.

In testimony whereof we have signed our names to this specification in the presence of two subscribing witnesses.

GIOVANNI QUAGLIA.
ARRIGO CAPELLO.

Witnesses:
   Avv. Mario Regiorgis,
   Caprisglio Francesco.